(12) United States Patent
Tian

(10) Patent No.: US 11,952,151 B2
(45) Date of Patent: Apr. 9, 2024

(54) VERTICAL TAIL FOR A COMPOSITE-WING UAV

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/161,084

(22) Filed: Jan. 29, 2023

(65) Prior Publication Data

US 2023/0242283 A1 Aug. 3, 2023

(30) Foreign Application Priority Data

Jan. 29, 2022 (CN) .......................... 202210110789.0

(51) Int. Cl.
*B64U 20/70* (2023.01)
*B64C 5/02* (2006.01)
*B64U 10/17* (2023.01)
*B64U 20/83* (2023.01)

(52) U.S. Cl.
CPC ................ *B64U 20/70* (2023.01); *B64C 5/02* (2013.01); *B64U 10/17* (2023.01); *B64U 20/83* (2023.01)

(58) Field of Classification Search
CPC ..... B64U 30/40; B64C 5/02; B64C 2025/005; B64C 25/60; B64C 25/62
See application file for complete search history.

(56) References Cited

U.S. PATENT DOCUMENTS

| | | | | |
|---|---|---|---|---|
| 8,465,311 B2* | 6/2013 | Takamatsu | ........... | G02B 6/3891 439/247 |
| 2019/0233098 A1* | 8/2019 | Tian | ........................ | B64C 11/46 |
| 2019/0263499 A1* | 8/2019 | Selyugin | ............... | B29C 70/202 |
| 2021/0339860 A1* | 11/2021 | Agostino | ............... | B64U 10/25 |
| 2021/0362851 A1* | 11/2021 | McCullough | ........... | B64C 27/28 |
| 2022/0194553 A1* | 6/2022 | Lüttmann | ............... | B64C 3/187 |
| 2023/0211878 A1* | 7/2023 | Schafer | .................. | B64U 30/10 244/7 B |

* cited by examiner

*Primary Examiner* — Tien Q Dinh
*Assistant Examiner* — William L Gmoser
(74) *Attorney, Agent, or Firm* — WPAT LAW, P.C.; Anthony King

(57) ABSTRACT

A vertical tail of a composite-wing unmanned aerial vehicle (UAV) having a body, a rudder face section, a rotor section, shock absorbing component and a quick installation assembly of circuit. The body includes a tail body frame and a shell. The rudder face section has a rudder machine and a rudder surface. The rudder surface is connected to one end of the tail for steering the directional deflection of the UAV. The shock absorbing component is connected to the lower end plate and the shock absorbing component absorbs the shock to the body. The quick installation assembly of circuit includes a plug, a positioning sleeve and a bias piece, the positioning sleeve is located on the outer circumference of the plug and slidingly connected to the plug, the bias piece is set between the plug and the positioning sleeve, the bias piece can absorb the impact on the plug.

15 Claims, 4 Drawing Sheets

VERTICAL TAIL FOR A COMPOSITE-WING UAV

FIELD OF THE DISCLOSURE

The present disclosure relates to the technical field of UAVs (unmanned aerial vehicles), in particular to a vertical tail of for a composite-wing UAV.

BACKGROUND OF THE INVENTION

The unmanned aerial vehicle (UAV) is an unmanned aircraft operated by radio remote control equipment and its own program control device. UAVs in existing technologies are mainly divided into fixed-wing UAVs, multi-rotor UAVs and composite-wing UAVs. In practice, fixed-wing UAV and multi-rotor UAV have their own advantages. The fixed-wing UAV has the characteristics of long endurance and high-altitude flight, and is widely used in surveying and mapping, geology, petroleum, agriculture and forestry and other industries. Multi-rotor UAV can take off and land vertically and hover in fixed air, which is mainly applicable to low altitude, low speed operations with vertical takeoff and landing and hover requirements.

With the rapid development of UAV technology, the functions of UAVs have become more and more perfect and have been deeply integrated into the practical operations of different industries. However, the complexity of UAV application scenarios also poses higher challenges to the performance of UAVs. At this stage, compound-wing UAVs are becoming a focal point in the UAV field because they combine the advantages of vertical take-off and landing capability with long-endurance flight.

Although the composite-wing UAV has the advantages of both fixed-wing UAV and multi-rotor UAV, it also has structural redundancy, which has caused many problems. It is well known in the field that UAVs are very sensitive to weight. Composite-wing UAVs usually have fixed wings and multiple rotors, which makes the UAV body have two more arms compared with ordinary multi-rotor UAVs, and also increases the structural weight of UAVs. When the composite-wing aircraft in the existing technology lands, it uses multi-rotor vertical landing. When it is close to a certain height on the ground, it will automatically stop the propeller and let the composite wing UAV fall freely. The composite-wing UAV itself has a large dead weight and is impacted by the ground rigidity. The composite-wing UAV structure and electrical components absorb too much impact energy, resulting in a significantly reduced service life of the composite-wing UAV.

SUMMARY OF THE INVENTION

Based on the above, the purpose of the present invention is to provide a vertical tail for a composite-wing UAV, which is capable of absorbing the impact energy of an aircraft landing and it is expandable, acting as a protection for the aircraft and enhancing the reliability and service life of the composite-wing UAV.

To solve the above technical problem, the present invention provides following solution:

A vertical tail for a composite-wing UAV, comprising:
a body, which comprises a tail body frame and a shell; the shell is wrapped around the outer side of the tail body frame; the tail body frame comprises a lower end plate and an upper end plate;
a rudder face section, which comprises a rudder machine and a rudder surface, the rudder surface is connected to one end of the body in the first direction, the rudder machine is connected to the rudder surface and is configured to drive the rudder surface;
a shock absorbing component, which is connected to the lower end plate; the shock absorbing component is configured to absorb the impact of the body; and
a quick installation assembly of circuit, which is arranged on the body; the quick installation assembly of circuit includes a plug, a positioning sleeve and a bias piece; the positioning sleeve is sleeved the outer circumference of the plug and is connected to the plug in a sliding way; the bias piece is arranged between the plug and the positioning sleeve; the bias piece is configured to absorb the shock to the plug.

As an option for the vertical tail for the composite-wing UAV, the shock absorbing component preferably comprises a shock absorber and a hoop, the shock absorber can be completely or partially wrapped in the shell. The hoop can be snapped to the outer side of the shock absorber and connected to the shell.

As an option for the vertical tail for the composite-wing UAV, the shock absorber can be a double-cylinder shock absorber, comprising an outer cylinder and an inner cylinder, the outer cylinder can be wrapped in the shell, one end of the outer cylinder can be connected to the lower end plate, the other end of the outer cylinder can be connected to the hoop.

As an option for the vertical tail for the composite-wing UAV, the shock absorbing component can further comprise a cushioning foot, the cushioning foot can comprise a buffer plate and a connecting frame, the end of the buffer plate away from the shock absorber can be a curved surface; the connecting frame can be hinged with the end of the shock absorber away from the lower end plate, the connecting frame can be provided with a plurality of assembly holes with different apertures, the assembly holes can be suitable for mounting an expansion structure.

As an option for the vertical tail for the composite-wing UAV, the cushioning foot can further comprise a limiting pin, the limiting pin can be plugged in a set of the assembly holes for limiting the swing angle of the cushioning foot.

As an option for the vertical tail for the composite-wing UAV, the plug can comprise a plug housing, an end cap and the bias piece. The circumferential outer side of the plug housing can be connected to the positioning sleeve; the plug housing can comprise an open end, the open end can be slidingly connected to the circumferential outer wall of the end cap; one end of the bias piece can be connected to the plug housing and the other end of the bias piece can be connected to the end cap; the end cap can be provided with a connector, the connector can be electrically connected to the tail's cable.

As an option for the vertical tail for the composite-wing UAV, the end cap can be provided with at least two of the connectors.

As an option for the vertical tail for the composite-wing UAV, the plurality of the connectors can be of different types.

As an option for the vertical tail for the composite-wing UAV, the open end can be provided with a restriction projection, the end cap can be provided with a chute in the circumferential direction, the restriction projection can be slidably connected to the chute.

As an option for the vertical tail for the composite-wing UAV, it can further comprise a rotor section, the rotor section can be connected to the upper end plate, the rotor section can include a rotor paddle and a driving motor, the driving motor can be connected to the rotor paddle and can be configured to be capable of driving the rotor paddle.

The Beneficial of the Invention is

The present invention provides a vertical tail for the composite-wing UAV, which comprises a body, a rudder face section, preferably a rotor section, a shock absorbing component and a quick installation assembly of circuit. The body includes the tail body frame and the shell. The tail body frame ensures the structural strength of the tail. The shell is wrapped around the outer side of the tail body frame to form a streamlined shell to improve the dynamic performance of the tail. The quick installation assembly of circuit is arranged on the body to realize the flexible connection of the electrical system of the composite-wing UAV. The tail body frame includes a lower end plate and an upper end plate. The lower end plate is used to connect to the shock absorbing component and is the shock bearing plate. The upper end plate is used to carry the rotor section. The rudder face section comprises a rudder machine and a rudder surface. The rudder surface is connected to one end of the body in the first direction. The rudder machine is connected to the rudder surface and is configured to drive the rudder surface. The shock absorbing component is connected to the lower end plate, and the shock absorbing component is configured to absorb the impact of the body. The quick installation assembly of circuit includes a plug, a positioning sleeve and a bias piece. The positioning sleeve is sleeved the outer circumference of the plug and is connected to the plug in a sliding way. The bias piece is arranged between the plug and the positioning sleeve. The bias piece is configured to absorb the shock to the plug. When the composite-wing UAV lands, the shock absorbing component can absorb the energy generated by the rigid impact of the composite-wing UAV with the ground, and the quick installation assembly of circuit can ensure the reliable connection of the electrical system of the composite-wing UAV, thus protecting the body of the composite-wing UAV and the internal electronic devices, enhancing the reliability and service life of the composite-wing UAV.

BRIEF DESCRIPTION OF DRAWINGS

In order to explain more clearly the technical solution in the embodiments of the invention, the following will briefly introduce the drawings that are used in the description of the embodiments of the present invention. It is obvious that the drawings in the following description are only some embodiments of the present invention. For ordinary technicians in the art, other drawings can also be obtained based on the contents of the embodiments of the present invention and these drawings without any creative work.

Figure 1:
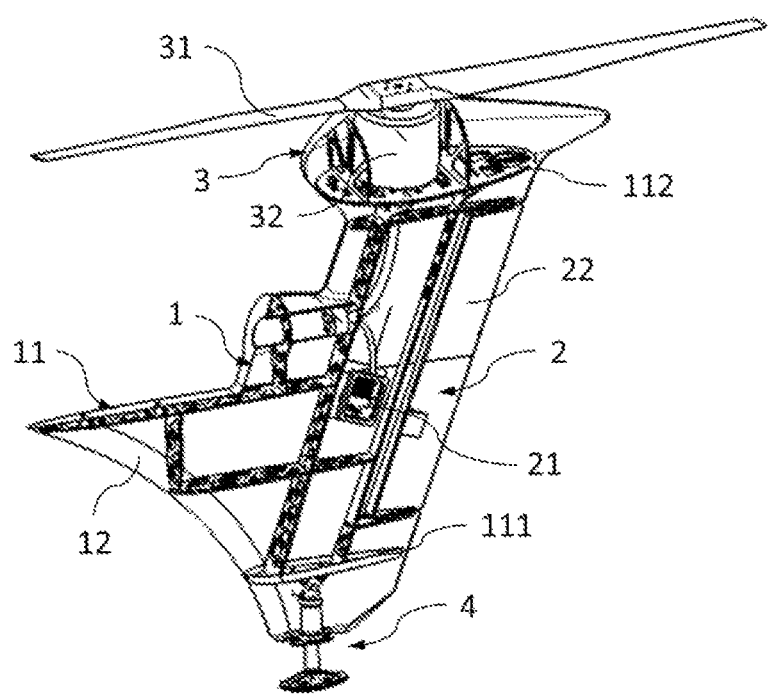
FIG. 1 is a schematic diagram of the structure of a vertical tail for a composite-wing UAV provided in the embodiment of the present invention.

The following call-out list of elements in the drawing can be a useful guide when referencing the elements of the drawing figures:
1. body; 11. tail body frame; 111. lower end plate; 112. upper end plate; 12. shell;
2. rudder face section; 21. rudder machine; 22. rudder surface;
3. rotor section; 31. rotor paddle; 32. driving motor;
4. shock absorbing component; 41. shock absorber; 411. outer cylinder; 412. inner cylinder; 42. hoop; 43. cushioning foot; 431. buffer plate; 432. connecting frame; 4321. assembly holes; 433. limiting pin;
5. quick installation assembly of circuit; 51. plug; 511. plug housing; 5111. open end; 5112. restriction projection; 512. end cap; 5121. connector; 5122. chute; 513. bias piece; 52. positioning sleeve; 53. positioning slot.

DETAILED DESCRIPTION

In order to resolve the stated technical problems and to clarify the technical solutions adopted and the technical effects achieved, the technical solutions of the embodiments of the invention will be further described in detail in combination with the attached drawings. Obviously, the described embodiments are only part of the embodiments of the invention, not all of them. Based on the embodiment of the invention, all other embodiments obtained by those skilled in the art without creative work belong to the protection scope of the invention.

FIG. 1 is a schematic diagram of the structure of the vertical tail for the composite-wing UAV provided in the embodiment of the present invention, as shown in FIG. 1, this embodiment provides a vertical tail for a composite-wing UAV, including a body 1, a rudder face section 2, a rotor section 3, a shock absorbing component 4 and a quick installation assembly of circuit 5, the body 1 includes a tail body frame 11 and a shell 12, the shell 12 is wrapped around the outer side of the tail body frame 11 to form a streamlined shell to improve the dynamic performance of the tail. Preferably, both the tail body frame 11 and the shell 12 are made of carbon fiber to achieve a lightweight tail. Further preferably, the tail body frame 11 is provided with hollow holes to further reduce the weight of the tail.

The rudder face section 2 comprises a rudder machine 21 and a rudder surface 22, the rudder surface 22 is connected to one end of the body 1 in the first direction, the rudder surface 22 can swing around the axis of the second direction to control the direction deflection of the UAV, the rudder machine 21 is connected to the rudder surface 22 and is constructed to drive the rudder surface 22.

The rotor section 3 includes the rotor paddle 31 and the driving motor 32. The rotor paddle 31 enables the UAV to take off and land vertically. The rotor paddle 31 is connected with one end of the body 1 in the second direction. The driving motor 32 is connected to the rotor paddle 31 and is configured to drive the rotor paddle 31. Optionally, the first direction and the second direction are perpendicular. Specifically, in this embodiment, the first direction is the length direction of the vertical tail for the composite-wing UAV, and the second direction is the height direction of the vertical tail for the composite-wing UAV.

The shock absorbing component 4 is connected to the end of the body 1 away from the rotor section 3. The shock absorbing component 4 is configured to absorb the impact of the body 1.

The quick installation assembly of circuit 5 is arranged on the body 1. The quick installation assembly of circuit 5 includes the plug 51, the positioning sleeve 52 and the bias piece 513. The positioning sleeve 52 is sleeved the outer circumference of the plug 51 and is connected to the plug 51 in a sliding way. The bias piece 513 is arranged between the plug 51 and the positioning sleeve 52. The bias piece 513 is constructed to absorb the shock to the plug 51.

When the composite-wing UAV lands, the shock absorbing component 4 can absorb the energy generated by the rigid impact of the composite-wing UAV with the ground, and the quick installation assembly of circuit 5 can ensure the reliable connection of the electrical system of the composite-wing UAV, thus protecting the body of the composite-wing UAV and the internal electronic devices, enhancing the reliability and service life of the composite-wing UAV.

Specifically, in this embodiment, the tail body frame 11 is crossed horizontally and vertically to ensure the structural strength of the tail. The tail body frame 11 includes the lower end plate 111 and the upper end plate 112. One side of the lower end plate 111 is connected to the end of the body 1 away from the rotor section 3. The lower end plate 111 is the main load-bearing structure when the vertical tail touches with the ground. The upper end plate 112 is located on the opposite side of the lower end plate 111 and connected to the body 1. The upper end plate 112 is used to carry the rotor section 3. Preferably, the rotor section 3 is connected to the upper end plate 112, and the shock absorbing component 4 is connected to the lower end plate 111.

Figure 2:
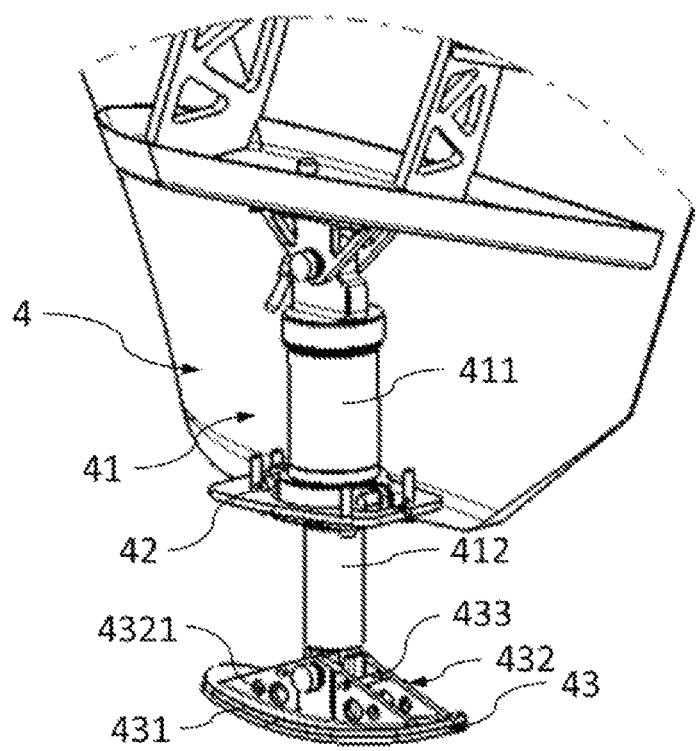
FIG. 2 is a schematic diagram of the structure of the shock absorbing component provided in the embodiment of the present invention.

FIG. 2 is the structural diagram of the shock absorbing component 4 provided in the embodiment of the invention. Referring to FIG. 2, the shock absorbing component 4 includes the shock absorber 41, the other side of the lower end plate 111 is connected to the shock absorber 41, and the shock absorption direction of the shock absorber 41 is the second direction. Preferably, the shock absorber 41 is hinged with the lower end plate 111 to prevent fatigue damage at the joint due to stress concentration.

Specifically, in this embodiment, the shock absorber 41 is a double-cylinder shock absorber, comprising the outer cylinder 411, the inner cylinder 412 sleeved on the inner side of the outer cylinder 411, the inner piston and the elastic element. The pressure medium is oil or nitrogen etc. Taking the oil medium as an example to illustrate that the elastic element in the shock absorber 41 is compressed under the action of an external force, and the outer cylinder 411 and the inner cylinder 412 are close to each other. At this time, the piston in the shock absorber 41 moves downward. The volume of the lower chamber of the piston decreases, the oil pressure increases, and the oil flows through the flow valve to the upper chamber above the piston. At this time, the piston rod occupies part of the space of the upper chamber, so the increased volume of the upper chamber is less than the reduced volume of the lower chamber, so the oil will push the compression valve open and flow back to the storage cylinder. Conversely, when the shock absorber 41 is reset, the shock absorber 41 is stretched. At this time, the piston of shock absorber 41 moves in the opposite direction. The oil pressure in the upper chamber of the piston rises, the flow valve closes, and the oil in the upper chamber pushes the extension valve open and flows into the lower chamber to realize the reset after shock absorption.

In other embodiments, the shock absorber 41 can also be a single-cylinder shock absorber or a combination of multiple shock absorbers according to actual needs.

During assembly, the shock absorber 41 is completely or partially wrapped in the shell 12 to reduce the air resistance of the shock absorber 41. As a preferred technical solution, the outer cylinder 411 of the shock absorber 41 is wrapped in the shell 12, and one end of the outer cylinder 411 is hinged with the lower end plate 111. The shock absorber 4 also includes a hoop 42, which is sleeved on the outside of the shock absorber 41 and connected to the other end of the outer cylinder 411. Specifically, the hoop 42 is sleeved on the outside of the end of the outer cylinder 411 far away from the lower end plate 111 and connected to the shell 12, so as to position the outer cylinder 411 and limit the swing of the outer cylinder 411.

Continue to refer to FIG. 2, the shock absorber 4 also includes the cushioning foot 43, which includes a buffer plate 431 and a connecting frame 432. The connecting frame 432 is hinged with the end of the shock absorber 41 away from the lower end plate 111, so that during the process of the tail touching the ground, even if the tail as a whole is not perpendicular to the ground, the cushioning foot 43 can rotate to the position facing the ground. Preferably, the end of the buffer plate 431 away from the shock absorber 41 is a curved surface.

As a preferred technical solution, the connecting frame 432 is provided with a plurality of assembly holes 4321 with different apertures, and the cushioning foot 43 also includes a limiting pin 433, which is plugged in a set of the assembly holes 4321 for limiting the swing angle of the cushioning foot 43.

Figure 3:
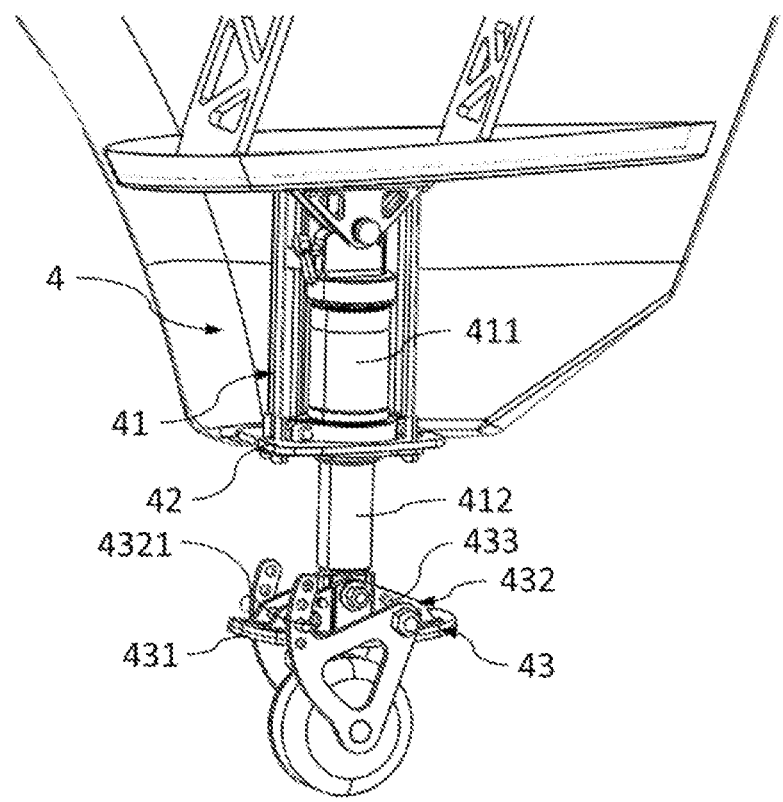
FIG. 3 is a schematic diagram of the structure of the cushioning foot with the rollers installed provided in the embodiment of the present invention.

The assembly hole 4321 can also be used to install an expansion structure. For example, as shown in FIG. 3, the assembly hole 4321 can be used to assemble a roller structure or other movable structures to enable the composite-wing UAV to move on the ground.

Figure 4:
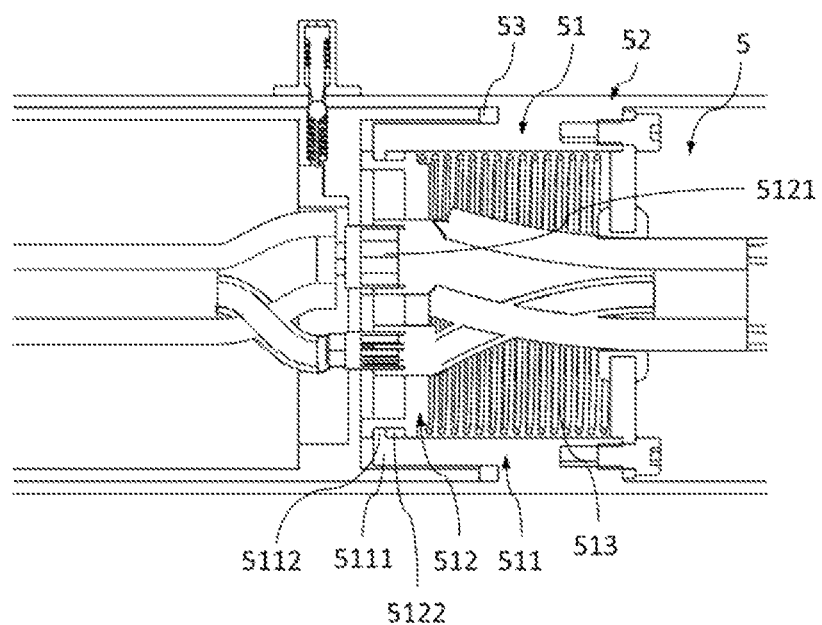
FIG. 4 is a schematic diagram of the structure of the quick installation assembly of circuit provided in the embodiment of the present invention.

FIG. 4 is the structural diagram of the quick installation assembly of circuit 5 provided in the embodiment of the present invention, as shown in FIG. 4, the plug 51 includes the plug housing 511 and the end cover 512, the circumferential outer side of the plug housing 511 is connected to the positioning sleeve 52, the plug housing 511 includes the open end 5111, the open end 5111 is slidingly connected to the circumferential outer wall of the end cap 512. Further, the open end 5111 is provided with a restriction projection 5112, the end cap 512 is provided with a chute 5122 in the circumferential direction, the restriction projection 5112 is slidably connected to the chute 5122. Preferably, the chutes 5122 are provided with limit sections at both ends along the sliding direction of the restriction projection 5112. The restriction projection 5112 and the limit sections ensure that the end cap 512 is at least partially connected to the plug housing 511 to prevent it from sliding out of the plug housing 511. The end cover 512 is equipped with a connector 5121, which is electrically connected to the tail's cable. One end of the backward facing the connector 5121 of the tail's cable is electrically connected to the rudder machine 21 and/or the driving motor 32. Preferably, the end cap 512 is provided with at least two connectors 5121. Furthermore, the types of multiple connectors 5121 are different.

Further specifically, one end of the bias piece 513 is connected to the end cap 512, and the other end of the bias piece 513 is connected to the plug housing 511, so as to enable the end cap 512 to be repeatedly moved relative to the plug housing 511. The bias piece 513 optimizes the existing rigid connection and realizes the flexible connection. When the vibration is large, the connection of the electrical system will usually fail or be damaged. The bias piece 513 can absorb the energy of the vibration and ensure the reliable connection of the electrical system.

As a preferred technical solution for a quick installation assembly of circuit, the quick installation assembly of circuit 5 further comprises a positioning slot 53, the positioning slot 53 is provided between the plug 51 and the positioning sleeve 52, the second plug or socket used in conjunction with the plug 51 comprises a limit insert plate, the limit insert plate extends outwards from one end of the second plug along the axial direction of the second plug, the limit insert plate is configured to be able to be inserted with the positioning slot 53. Exemplarily, it is noted that the positioning slot 53 is a curved slot and the limit insert plate is an insert plate adapted to the shape of the positioning slot 53, so that quick positioning of the plug 51 and the second plug are achieved when the limit insert plate is aligned with the positioning slot 53.

It is noted that the above is only a preferred embodiment of the present invention and the technical principles employed. It will be understood by those skilled in the art that the present invention is not limited to the particular embodiments described herein and that various variations, readjustments and substitutions can be apparent to those skilled in the art without departing from the scope of protection of the present invention. Thus, although the invention has been described in some detail by means of the above embodiments, the invention is not limited to the above embodiments, but may include further equivalent embodiments without departing from the present conception of the invention, the scope of which is determined by the scope of the appended claims. It is only for the convenience of describing the invention and simplifying the description, but not to indicate or imply that the device or element referred to must have a specific orientation, be constructed and operate in a specific orientation, and therefore cannot be understood as a limitation of the invention. In addition, the terms "first" and "second" are only used for descriptive purposes and cannot be understood as indicating or implying relative importance. Wherein, the terms "first position" and "second position" are two different positions.

In the description of the present invention, it is to be noted that, unless otherwise expressly specified and limited, the terms "mount", "connect", "communicate" are to be understood in a broad sense, for example, as fixed, detachable or integral. It may be a mechanical or electrical connection; it may be a direct connection or an indirect connection through an intermediate medium, and it may be a connection within two components. For a person of ordinary skill in the art, the specific meaning of the above terms in the context of the present invention can be understood in specific cases.

What is claimed is:

1. A vertical tail for a composite-wing unmanned aerial vehicle (UAV) comprising:
    a body (1) having a tail body frame (11) and a shell (12);
    wherein the shell (12) is wrapped around an outer side of the tail body frame (11);
    wherein the tail body frame (11) has a lower end plate (111) and an upper end plate (112);
    a rudder face section (2) having a rudder machine (21) and a rudder surface (22), the rudder surface (22) is connected to an end of the body (1) in a first direction, the rudder machine (21) is connected to the rudder surface (22) and is configured to drive the rudder surface (22);
    a shock absorbing component (4), which is connected to the lower end plate (111) and is configured to absorb an impact of the body (1); and
    the shock absorbing component (4) comprises a shock absorber (41) and a hoop (42), the shock absorber (41) is completely or partially wrapped in the shell (12); wherein the hoop (42) is snapped to an outer side of the shock absorber (41) and connected to the shell (12);
    wherein the shock absorber (41) is a double-cylinder shock absorber, comprising an outer cylinder (411) and an inner cylinder (412);
    the outer cylinder (411) is wrapped in the shell (12), a first end of the outer cylinder (411) is connected to the lower end plate (111), a second end of the outer cylinder (411) is connected to the hoop (42).

2. The vertical tail for the composite-wing UAV according to claim 1, characterized in that the shock absorbing component (4) further comprises a cushioning foot (43); wherein the cushioning foot (43) comprises a buffer plate (431) and a connecting frame (432); wherein an end of the buffer plate (431) disposed away from the shock absorber (41) has a curved surface; the connecting frame (432) is hinged with a first end of the shock absorber (41) disposed away from the lower end plate (111); the connecting frame (432) is provided with a plurality of assembly holes (4321), the assembly holes (4321) are suitable for mounting an expansion structure.

3. The vertical tail for the composite-wing UAV according to claim 2, characterized in that the cushioning foot (43) further comprises a limiting pin (433), wherein the limiting pin (433) is plugged in a set of the assembly holes (4321) for limiting the swing angle of the cushioning foot (43).

4. The vertical tail for the composite-wing UAV according to claim 1 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

5. The vertical tail for the composite-wing UAV according to claim 1 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

6. The vertical tail for the composite-wing UAV according to claim 2 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

7. The vertical tail for the composite-wing UAV according to claim 3 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

8. A vertical tail for a composite-wing unmanned aerial vehicle (UAV) comprising:
    a body (1) having a tail body frame (11) and a shell (12);
    wherein the shell (12) is wrapped around an outer side of the tail body frame (11);
    wherein the tail body frame (11) has a lower end plate (111) and an upper end plate (112);
    a rudder face section (2) having a rudder machine (21) and a rudder surface (22), the rudder surface (22) is connected to an end of the body (1) in a first direction, the rudder machine (21) is connected to the rudder surface (22) and is configured to drive the rudder surface (22);
    a shock absorbing component (4), which is connected to the lower end plate (111) and is configured to absorb an impact of the body (1);
    wherein the shock absorbing component (4) comprises a shock absorber (41) and a hoop (42), the shock absorber (41) is completely or partially wrapped in the shell (12);

wherein the hoop (42) is snapped to an outer side of the shock absorber (41) and connected to the shell (12); and a circuit assembly (5) arranged on the body (1), wherein the circuit assembly (5) includes a plug (51), a positioning sleeve (52) and a bias piece (513);

wherein the positioning sleeve (52) comprises a plug housing (511);

wherein the plug (51) comprises an end cap (512) and the bias piece (513);

wherein a circumferential outer side of the plug housing (511) is connected to the positioning sleeve (52);

wherein the plug housing (511) comprises an open end (5111), the open end (5111) is slidingly connected to a circumferential outer wall of the end cap (512); wherein a first end of the bias piece (513) is connected to the plug housing (511) and a second end of the bias piece (513) is connected to the end cap (512);

wherein the end cap (512) is provided with a connector (5121) and the connector (5121) is electrically connected to a cable; and wherein the positioning sleeve (52) is sleeved on the circumferential outer wall of the end cap (512) with the bias piece (513) disposed between the positioning sleeve (52) and the circumferential outer wall of the end cap (512).

9. The vertical tail for the composite-wing UAV according to claim 8, characterized in that the end cap (512) is provided with at least two connectors (5121).

10. The vertical tail for the composite-wing UAV according to claim 9 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

11. The vertical tail for the composite-wing UAV according to claim 9, characterized in that the at least two connectors (5121) are of different types.

12. The vertical tail for the composite-wing UAV according to claim 11 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

13. The vertical tail for the composite-wing UAV according to claim 8, characterized in that the open end (5111) is provided with a restriction projection (5112); wherein the end cap (512) is provided with a chute (5122) in a circumferential direction and the restriction projection (5112) is slidably connected to the chute (5122).

14. The vertical tail for the composite-wing UAV according to claim 13 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

15. The vertical tail for the composite-wing UAV according to claim 8 further comprising a rotor section (3) connected to the upper end plate (112); wherein the rotor section (3) includes a rotor paddle (31) and a driving motor (32); wherein the driving motor (32) is connected to the rotor paddle (31) and configured to drive the rotor paddle (31).

* * * * *